US009686513B2

(12) United States Patent
Shishalov et al.

(10) Patent No.: US 9,686,513 B2
(45) Date of Patent: Jun. 20, 2017

(54) FOREST FIRE VIDEO MONITORING SYSTEM AND METHOD

(75) Inventors: Ivan Sergeevich Shishalov, Nizhny Novgorod (RU); Oleg Andreevich Gromazin, Nizhny Novgorod (RU); Yaroslav Sergeevich Solovyev, Nizhny Novgorod (RU); Aleksandr Vladimirovich Romanenko, Nizhny Novgorod (RU); Ivan Vasilievich Esin, Nizhny Novgorod (RU)

(73) Assignee: DISICON, Nizhny Novgorod (RU)

( * ) Notice: Subject to any disclaimer, the term of this patent is extended or adjusted under 35 U.S.C. 154(b) by 840 days.

(21) Appl. No.: 14/002,220

(22) PCT Filed: Jan. 31, 2012

(86) PCT No.: PCT/RU2012/000045
§ 371 (c)(1),
(2), (4) Date: Nov. 4, 2013

(87) PCT Pub. No.: WO2012/118403
PCT Pub. Date: Sep. 7, 2012

(65) Prior Publication Data
US 2014/0049640 A1 Feb. 20, 2014

(30) Foreign Application Priority Data

Mar. 2, 2011 (RU) .............................. 2011108066

(51) Int. Cl.
*H04N 9/47* (2006.01)
*H04N 7/18* (2006.01)
(Continued)

(52) U.S. Cl.
CPC ............. *H04N 7/18* (2013.01); *G08B 17/005* (2013.01); *G08B 17/125* (2013.01); *G01C 17/34* (2013.01)

(58) Field of Classification Search
CPC .... G01C 17/34; G08B 17/005; G08B 17/125; H04N 7/18
See application file for complete search history.

(56) References Cited

U.S. PATENT DOCUMENTS 5,388,990 A * 2/1995 Beckman ................. G09B 9/08
345/419
6,366,212 B1 * 4/2002 Lemp ..................... G02B 23/16
33/268
(Continued)

FOREIGN PATENT DOCUMENTS

BY          8173 C1    6/2006
KR     100839090 B1    6/2008
(Continued)

OTHER PUBLICATIONS

English Abstract of BY8173 retrieved from Google Translate on Sep. 10, 2016.
(Continued)

*Primary Examiner* — Nhon Diep
(74) *Attorney, Agent, or Firm* — BCF LLP (57) ABSTRACT

The invention relates to the forest video monitoring. A method and system are provided for automatically binding a video camera to the absolute coordinate system and determining changes in the video camera binding. In one aspect, the method comprises the steps of: in each of at least two predetermined time moments, aiming the video camera at an object a position of which in the absolute coordinate system centered in a point in which the video camera resides is known at said moment, and determining an orientation of the video camera in a native coordinate system of the video camera; and, based on the determined orientations of the video camera and positions of the object, calculating a rotation of the native coordinate system of the video camera in the absolute coordinate system. The calculated rotation of
(Continued)

the video camera's native coordinate system is used to recalculate coordinates of an observed object from the video camera's native coordinate system into the absolute coordinate system. The technical result relates to the improved accuracy of locating the observed object.

18 Claims, 3 Drawing Sheets

(51) Int. Cl.
  *G08B 17/00* (2006.01)
  *G08B 17/12* (2006.01)
  *G01C 17/34* (2006.01)

(56) References Cited

U.S. PATENT DOCUMENTS

| | | | | |
|---|---|---|---|---|
| 6,392,799 | B1* | 5/2002 | Baun | G02B 23/00 359/429 |
| 7,305,983 | B1* | 12/2007 | Meder | G01W 1/12 126/621 |
| 8,392,074 | B2* | 3/2013 | Zeng | B60J 3/0204 701/36 |
| 2007/0283583 | A1* | 12/2007 | Subbiondo | G06Q 10/06 33/268 |
| 2008/0236568 | A1* | 10/2008 | Hickerson | F24J 2/38 126/578 |
| 2009/0107485 | A1* | 4/2009 | Reznik | F24J 2/07 126/600 |

FOREIGN PATENT DOCUMENTS

| | | |
|---|---|---|
| RU | 2293998 C2 | 2/2007 |
| WO | 0023959 A1 | 4/2000 |

OTHER PUBLICATIONS (Book) Devid A. Forsayt, "Computer vision. Modern Approach / Kompyuternoe zrenie. Sovremennyy podkhod" ISBN 9785845905420 / 5845905427.

International Search Report with regard to PCT/RU2012/00045 (date of mailing: Jun. 28, 2012).

* cited by examiner

FOREST FIRE VIDEO MONITORING SYSTEM AND METHOD

FIELD OF THE INVENTION

The present invention relates generally to the field of video surveillance, and more particularly, to a system and method for video monitoring of forests, which, in general, provides the ability to monitor large forest areas for early detection of forest fires for further localization and extinguishing.

BACKGROUND ART

The forest fire video monitoring systems intended for detecting and locating forest fires are relatively new. However, their importance is ever growing, as the problem of forest fires can rightly be considered as one of the most serious and unresolved human problems at the moment. Forest fires occur and cause great damage in many countries of the world, as evidenced by wildfires in Russia in summer of 2010 which had disastrous consequences, including failure to comply with early detection and location of the fires, as widely discussed in detail in mass media.

Figure 1:
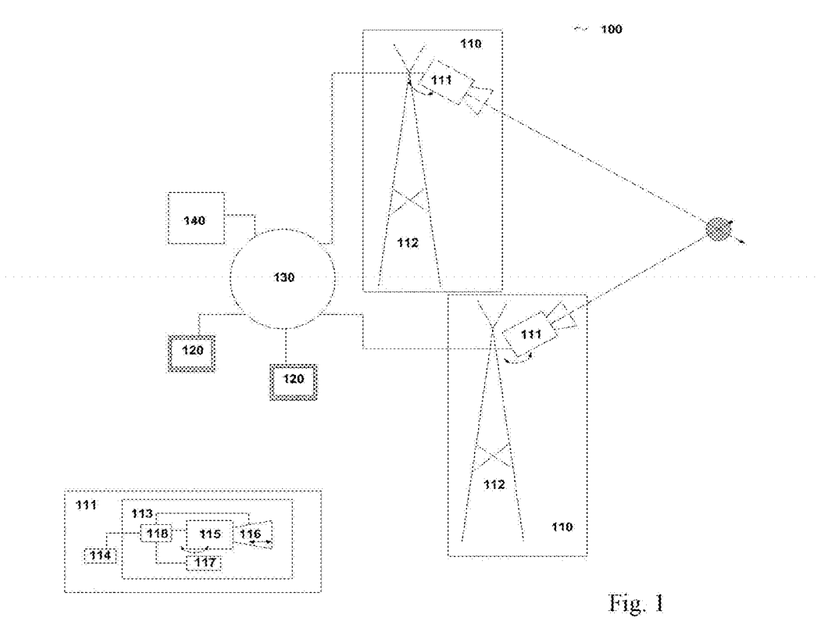
FIG. 1 is a schematic partial view of the forest fire video monitoring system.

In a typical case illustrated in FIG. 1, the forest fire video monitoring system 100 includes one or more remotely controlled video monitoring points 110 and one or more associated automated operator workstations 120 to properly operate the video monitoring points 110.

The equipment 120 of an automated operator workstation, in general, is based on well-known computer and communication technologies, and it typically comprises a computer with special and general purpose software that is configured for remote data exchange. Hardware and general purpose software (e.g., operating system) forming part of such a computer are well known in the art. Thus, the term "computer" can refer to a personal computer, a laptop, a set of interconnected computers, etc. with characteristics that meet the requirements of the system 100. The computer has a display device coupled thereto that displays, when the computer is operated, a graphical user interface (GUI) associated with a specialized application by which the operator visually monitors the territory and controls the video monitoring points 110. Interaction with the elements of the graphical user interface is performed by means of well-known input devices connected to the computer, such as keyboard, mouse, etc.

Such an operator workstation can be arranged in a specialized control and monitoring center. The presence of multiple workstations 120 allows to distribute the load among multiple operators to thereby improve the quality of detection.

Each video monitoring point 110 is substantially a transmission-side equipment 111 arranged on a high-rise construction 112.

The high-rise construction 112, in general, can be any high-rise construction which meets the requirements imposed on the system 100 (i.e. adapted to accommodate the transmission-side equipment at a sufficient height and configured to inspect large areas), and is usually a communication service provider tower, mobile operator tower, television tower, lighting tower, etc.

Generally, the term "transmission-side equipment" 111 denotes equipment which is arranged on the high-rise construction 112 and comprises a controlled video device 113 and a communication module 114 for communication/data exchange with the operator workstation(s) 120.

The controlled video device 113 is generally a digital video camera 115 (i.e., a device that converts electromagnetic waves of the optical range, or of a range close to the optical range, into an electrical signal) equipped with a zoom 116 (i.e., with an appliance designed for zooming in/out an acquired image) and mounted on the rotating device 117 which enables to mechanically change the orientation of the video camera 115 with high accuracy.

The transmission-side equipment 111 also includes a camera control unit 118 connected to the communication module 114, the video camera 115, the zoom 116, and the rotating device 117, and intended for general control over the functions of the controlled video device 113 as a whole and its components in particular. In this manner, upon receipt of control signals from the operator via the communication module 114, the control device 118 is adapted to set the required spatial orientation of the camera 115 (for example, to aim it at an object to be monitored), by operating the rotating device 117, and/or to perform zooming in/out of the picture of the object under surveillance from said camera, by operating the zoom. In addition, the control unit 118 is adapted to determine the current spatial orientation of the video camera 115 and provide data on its current spatial orientation through the communication module 114 to the requesting party (in particular, to the operator workstation 120 where the data, for example, is displayed in the graphical user interface). The functional capabilities listed here are the well-known properties of modern controlled video camera assemblies available on the market.

Generally, the control device 118 is a microprocessor-based hardware unit, like a controller or a microcomputer, programmed in a known manner and/or programmable to perform the functions assigned to it, which should be obvious to those skilled in the art. The programming of the control unit 118 can be performed, for example, by flashing its firmware, which is well known in the art. Accordingly, the video camera control device 118 is typically connected to a storage device (e.g., an integrated flash memory) which stores the related software or firmware which, when executed, implements the functions associated with the control device 118.

The operator workstations 120 may be connected to the monitoring points, both directly and via a communication network (e.g., a network 130) using well-known and broadly used wired and/or wireless, digital and/or analog communications technologies, and thus the communication module 114 of the video monitoring point and the computer communication interface of the operator workstation 120 should meet the communication standards/protocols for establishing such a communication link.

The exemplary network 130, to which the video monitoring points and the workstations 120 are connected, can be an address network, such as the Internet. If the video monitoring point 110 is near a communication channel belonging to an external provider, which is commonplace, then it is preferable to use this channel to connect the transmission-side equipment 111 to the Internet. If the video monitoring point 110 can not be connected directly to the Internet, then the well-known wireless broadband technologies (e.g. WiFi, WiMAX, 3G, etc.) are used for communication between the transmission-side equipment 111 and an Internet access point. In a similar way, the operator workstations 120 are connected to the network 130. For example, depending on the implemented access technology, a modem (including a wireless one), a network interface card (NIC), a wireless access card, etc., which can be external or internal in relation to the computer of the operator workstation 120, can be used for connecting to the network 130.

The system 100 also preferably includes a server 140 which is connected to the network 130 and which is delegated with the functions of centralized management over the totality of video monitoring points 110 and their interaction with the operator workstations 120 to ensure reliable operation of the system 100. The server 140 is usually a high-performance computer or a set of interconnected computers (for example, a blade server chassis) having specialized server software installed thereon and a high speed (e.g. optical) connection to the Internet. The hardware/software implementation of such a server is obvious to those skilled in the art. In addition to the general functions of managing the system 100, the server 140 can perform a variety of highly specialized functions—for example, it can operate as a video server that provides intermediate data processing and sends the processed data to a user upon request.

The description of specific implementations of data/signal exchange between the video monitoring points 110, the operator workstations 120, and the server 140 via the network 130 is omitted, because they are widely known in the art.

With such a method of implementing the forest fire video monitoring system, a single user is able to monitor a large enough controlled territory, while manipulating multiple cameras at a time. In addition, due to the above characteristic functional capabilities, the ability is provided to automatically quickly locate the source of fire visible from multiple cameras, using the well-known azimuth method, and to store in memory (e.g., in the server 140 or in the computer of the operator workstation 120) predefined patrol paths for quick access thereto and monitoring thereof. Here, "patrol path" refers to a predefined sequence of changing the camera orientation to obtain visual information regarding the required predetermined area.

It should be noted that performance of modern electronic hardware allows to create based thereon imaging and control devices among the components of the forest fire video monitoring system with a wide user functionality, which greatly simplifies the operator's work. In addition, modern hardware, with special software executable thereby, can take over some of the functions of automatic detection of potentially dangerous objects on video or still images obtained from the video cameras (when monitoring forests, such objects may be smoke, fire, etc.). Such computer vision systems intended to find dangerous objects in images can use a priori information about the features of smoke or fire, for example, specific movement, color, brightness, etc., or other indicia of fire, for example, they can detect warm air from fire with a thermal imager, or they are able to detect emissions of certain gases with a gas analyzer. Such computer vision systems are used in many industries, ranging from robotics to security systems, which is described in detail, for example, in "Computer Vision: Modern Approach", David Forsyth and Jean Ponce, Williams Publishing, 2004, 928 sheets. In this context, an intrinsic characteristic of automatic detection based on computer vision is the probability of false alarm and target missing that must be reduced by all means in each video monitoring system.

Such an intelligent subsystem that implements the indicated computer vision technologies can be also deployed in the operator workstation 120, the server 140, and even in the controlled video device 113 itself.

Above is the generalized structural description of a typical modern forest fire video monitoring system which operates based on the usage of controlled video cameras. The given generalized description is not implied as exhaustive and is just intended for assistance in better understanding of the invention which is described in detail below.

The known examples of such forest fire video monitoring systems are ForestWatch (Canada), IPNAS (Croatia) and FireWatch (Germany). Similar systems have been developed in the Russian Federation (for example, "Klen", "Baltika", "Lesnoi Dosor").

It should be noted that development and deployment of such forest fire video monitoring systems has become possible only in last few years. Only now, the number of cell communication towers is such that they cover the main fire risk areas, thereby minimizing infrastructure costs. In addition, broadband Internet services have also become much more affordable, which allows to exchange with large amounts of information and transmit real-time video over the Internet, and the cost of equipment for wireless communications over long distances has reduced. It should be further noted that detection of forest fires with cameras started from the beginning of century XXI, but the systems proposed by that time were composed of primitive rotatable cameras and the operator's screen which was to be in close proximity to the point of video monitoring. In practice, the proposed systems could not be scaled up and used for detecting fires even within a single forest district, not to mention big regions.

SUMMARY

The following shortcomings are typical to the existing forest fire video monitoring systems.

1. the Problem of Accuracy of Determining Visible Object Coordinates

The accuracy of determination of coordinates of a visible object is defined by such parameters as:

the accuracy of locating a video camera (the accuracy of binding the video camera to the terrain);

the accuracy of binding the video camera orientation to the coordinate system relative to the north and the angle of deviation from the mathematical horizon (the vertical angle).

As noted above, the rotating device enables to change the camera orientation—such rotating devices make it possible to change, within a certain range, the vertical and horizontal angles, i.e. the video camera direction is actually changed in the spherical coordinate system which is bound directly to the rotating device (i.e. in the native coordinate system of the video camera.)

When installing and operating the video camera, it is necessary to determine the orientation of the camera's native coordinate system relative to the spherical coordinate system the center of which is situated in the location of the video camera, the unit vector with the coordinates $\phi=0$, $\theta=0$, $\rho=1$ coincides with the north direction, and the unit vector with the coordinates $\phi=0$, $\theta=-90°$, $\rho=1$ coincides with the vertical (in astronomy such coordinate system is called topocentric or horizontal, here this system of coordinates will be referred to as the "absolute coordinate system of the video camera").

The current location of the video camera can be determined quite accurately, for example, using the modern GPS-based means.

The accuracy of determination of the current orientation of the video camera in its native coordinate system can also be rather high, which is provided by modern rotating devices (up to 0.1-0.05', as, for example, in the case of controlled video cameras manufactured by AXIS), and this accuracy is ever growing with development of technology.

At the same time, it is almost impossible to eliminate the problems associated with the accuracy of binding the video camera's native coordinate system to the absolute coordinate system—namely this binding is responsible for the final accuracy of locating a visible object. This problem is caused by complexity of the original binding (when mounting the video camera) and the sub-binding during the system operation that is necessitated by structural deformations of the high-rise construction on which the camera is fixed, by the nonideal fixing of the camera, and other factors.

2. High Probability of False Alarms

When using of the computer vision subsystem briefly described above, an important factor is the capability of validating (i.e., acknowledging) potentially dangerous objects. This confirmation can be accomplished, for example, by the operator that filters out the false detected objects. This validation facilitates operation of the automatic subsystem, since in the case of subsequent detection of a dangerous object in the same direction, the subsystem can use the information entered by the operator about the type of said object. The operation of such an algorithm must be based on the possibility of determining the exact current orientation of the video camera, so that later, when an object is detected in the same direction (i.e., substantially the same object), said object is excluded from the class of dangerous objects.

To perform this function, it is necessary to accurately determine that the current camera direction coincides with the one that has been validated by the user, with the accuracy sufficient for operation of the subsystem. This procedure is rather difficult, because, as mentioned above, the video camera, being fully adapted for rigid fixation on the rigid structure of the high-rise construction, can not provide complete stillness, that is, the orientation of the camera's native coordinate system displaces, and therefore, the accuracy of the filtering procedure is related to the accuracy of determination of the current direction.

This becomes especially urgent in detecting faraway (more than 15 km) objects when the angular size of the object is small enough (less than 1'): in this case, even a small deviation of the camera will cause incorrect estimation of the location of said object.

3. Failure to Locate an Object Visible from Only One Camera

This problem occurs in the boundary areas where it is not possible or economically feasible to place at least a second camera to locate a dangerous object. In addition, failure to at least approximately determine the location of the object with a single video camera makes it difficult to find said object with another video camera from which it can also be seen.

SUMMARY OF THE INVENTION

One object of the present invention is to provide a forest fire video monitoring system and a method implemented thereby that automatically bind the video camera's native coordinate system to the absolute coordinate system associated with the video camera, in order to improve the accuracy of locating the observed object. The system and method according to this object substantially address the first of the shortcomings listed above.

According to the aspect corresponding to said object, a forest fire video monitoring system is provided. The system comprises: at least one remotely controlled video monitoring point; and at least one computerized operator workstation for operating said video monitoring point. The system may further comprise a server, wherein the video monitoring points, the server, and the operator workstations are communicatively interconnected (e.g., an address network).

The remotely controlled video monitoring point includes: a high-rise construction; and a transmission-side equipment residing on the high-rise construction. The transmission-side equipment comprises: a video camera on a rotating device; and a camera control unit configured to determine a current spatial orientation of the video camera in a native coordinate system of the video camera. The video camera is equipped with a zoom.

The proposed forest fire video monitoring system also comprises a computer-implemented module configured, in each of at least two predetermined time moments, to obtain an orientation of the video camera aimed at a known astronomical object, the orientation determined by the camera control unit in the native coordinate system of the video camera, and to determine, based on a predetermined location of the video monitoring point and said time moment, a position of the astronomical object in an absolute coordinate system centered in a point in which the video camera resides. The computer-implemented module is also configured to calculate, based on the determined orientations of the video camera and positions of the astronomical object, a rotation of the video camera's native coordinate system in the absolute coordinate system.

The computer-implemented module may reside in the server, and/or in the operator workstation, and/or in the transmission-side equipment of the video monitoring point.

The astronomical object is preferably Sun, and the location of the video monitoring point is determined by its geographical coordinates, while the position of the astronomical object is determined by its azimuth and angular altitude above the horizon.

The camera can be aimed at the astronomical object by manually matching the center of an image obtained from the video camera with the center of the astronomical object.

The proposed system may further comprise a computer-implemented intelligent subsystem configured, based on computer vision technologies, to aim the video camera at the astronomical object by automatically detecting the astronomical object based on analysis of an image obtained from the video camera, and automatically matching the center of the image obtained from the video camera with the center of the astronomical object.

When aiming the video camera at the astronomical object, the zoom is preferably used to zoom in the astronomical object to the maximum possible extent.

A method implemented by the proposed forest fire video monitoring system is provided for automatically binding a native coordinate system of a video camera to an absolute coordinate system, the method comprising: at each of at least two predetermined time moments, aiming the video camera at a known astronomical object, and determining an orientation of the video camera in the native coordinate system of the video camera; and determining, based on a predetermined location of the video monitoring point and said time moment, a position of the astronomical object in an absolute coordinate system centered in a point in which the video camera resides. Then, the method comprises calculating, based on the determined orientations of the video camera and positions of the astronomical object, a rotation of the video camera's native coordinate system in the absolute coordinate system.

Based on the calculated rotation of the video camera's native coordinate system, it is possible to perform recalculation of coordinates of an observed object from the video camera's native coordinate system into the absolute coordinate system.

It should be emphasized that, according to the aspect under consideration, said astronomical object may be, as a matter of fact, represented by any discernible object whose position in the absolute coordinate system camera is known at a given time moment.

Another object of the invention is to provide a forest fire video monitoring system and a method implemented thereby which determine a change in binding of a video camera in order to accurately determine its current direction while filtering out non-dangerous objects. In fact, the system and method according to this object substantially address the second of the shortcomings listed above.

According to the aspect corresponding to this object, a forest fire video monitoring system is provided that comprises the same components as listed above in relation to the preceding aspect. The proposed system further comprises a data store to store orientations of the camera in the video camera's native coordinate system, the orientations determined by the camera control unit upon aiming the camera at each of at least two predefined discernible still objects in the terrain. The computer-implemented module in the system is configured, for each of said objects, to receive a current orientation of the video camera in the camera's native coordinate system, the current orientation determined by the camera control unit upon re-aiming the video camera at said object. The computer-implemented module is also configured, based on the received current orientations of the video camera and the respective stored orientations of the video camera, to calculate a rotation of the video camera's native coordinate system.

Preferably, the computer-implemented module is further configured, when comparing a current orientation of the video camera aimed at an observed object, with a stored orientation of the video camera when aimed at a previously analyzed object, to adjust said stored orientation of the camera based on the calculated rotation of the video camera's native coordinate system.

The method implemented by the proposed forest fire video monitoring system is provided for determining a change in binding of a video camera, the method comprising: aiming the video camera at each of at least two predefined discernible still objects in the terrain, and determining an orientation of the video camera in a native coordinate system of the video camera. Then, the determined orientations of the video camera are stored. After that, for each of said objects, the camera is aimed according to the stored orientation of the video camera corresponding to said object, and, in case of deviation of the camera from the object, the camera is re-aimed at the object, and a current orientation of the camera in the video camera's native coordinate system is determined. Finally, based on the determined current orientations of the video camera and the respective stored orientations of the video camera, a rotation of the video camera's native coordinate system is calculated. When comparing a current orientation of the camera aimed at an observed object with a stored orientation of the video camera when aimed at a previously analyzed object, this stored video camera orientation can be adjusted based on the calculated rotation of the video camera's native coordinate system.

Yet another object of the present invention is to provide a forest fire video monitoring system and a method implemented thereby which are used to determine the distance to an observed object using one video camera with sufficiently high accuracy. The system and method according to the this object substantially address the third of the above shortcomings.

BRIEF DESCRIPTION OF THE FIGURE DRAWINGS

The above and other aspects and advantages of the present invention are disclosed in the following detailed description, with reference to the drawings in which.

DETAILED DESCRIPTION OF THE INVENTION

In the following disclosure of the present invention, reference will be made to the forest fire video monitoring system 100 of FIG. 1, where the description of said system fully relates to disclosure of the present invention. In this section, in order to avoid unnecessary repetitions and cumbersome description, the components of the video monitoring system 100, which are generally typical to the prior art systems, will not be described again in detail.

Furthermore, the disclosure of the present invention is presented in subsections corresponding to the objectives stated above.

1. Automatic Binding of the Video Camera's Native Coordinate System to the Absolute Coordinate System Referring to FIG. 2, there is described the method 200 implemented in the video monitoring system (such as the system 100 of FIG. 1) for automatically binding the video camera's native coordinate system (CS) to the absolute coordinate system.

In astronomy, the methods are known to determine, with high accuracy, horizontal (topocentric) coordinates (i.e., azimuth (the angle from the north direction) and angular altitude (the angle from the mathematical horizon)) of various celestial bodies, such as Sun, based on geographical coordinates of the observer and the exact time of day. The widespread use of these methods is known, in particular, in marine navigation.

Figure 2:
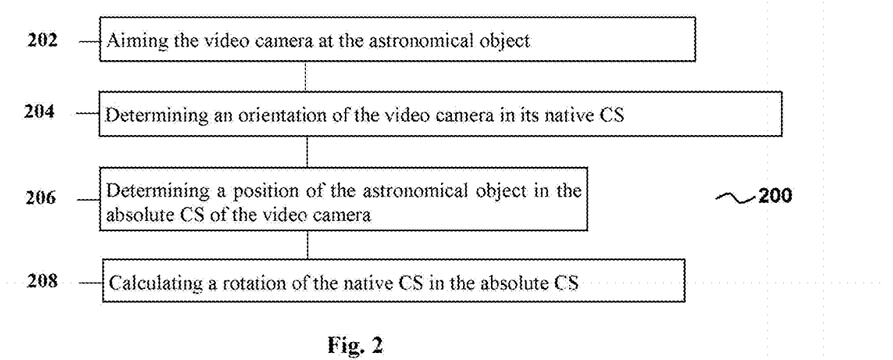
FIG. 2 is an illustrative flowchart of the method for automatically binding the video camera's native coordinate system to the absolute coordinate system according to the present invention.

In step 202, the video camera 115 is aimed at a known astronomical object (such as Sun, Moon, etc.).

The camera 115 can be aimed manually, that is, the operator detects the astronomical object when viewing the area and points the video camera thereto, such that the center of the image acquired from the camera matches the center of said object. In an exemplary embodiment, this is accomplished by interaction of the operator, using input devices, with the respective elements of the graphical user interface displayed in the display device, so that the computer of the operator workstation 120 generates control commands sent over the network 130 (possibly through the server 140 and with its direct participation) to the appropriate transmission-side equipment(s) 111, where those commands are delivered through the communication module 114 to the camera control unit 118 which generates based on said commands the control signals for driving the rotating device 117 to set such a spatial orientation of the camera 115 that it is aimed at the respective astronomical object.

This procedure can be also performed automatically, that is, in the automatic mode the video camera 115 views the area and, by means of special computer vision algorithms implemented in the system 100, as noted above, detects an object with characteristics known in advance (for example, in the case of Sun it will be a bright circle).

When aiming the video camera 115 at the astronomical object, the astronomical object is preferably zoomed in to the maximum possible extent (to this end, in the exemplary embodiment, the camera control device 118 appropriately controls the zoom 116) and the center of the image obtained from the camera is manually or automatically aligned with the center of the astronomical object.

The location of the astronomical object can be estimated with the accuracy of up to several tenths/hundredths of a degree. In particular, the angular size of Sun is about 31'27". Modern cameras can achieve magnification at which the viewing angle is V. Computer vision techniques allow to determine the center position of the circle in the image with the accuracy of up to few pixels. That is, if the video camera has the resolution of one or more megapixels, then the accuracy of determination of the direction to Sun may be about 0.05".

Upon aiming the camera at the astronomical object, step 204 determines the orientation of the camera in its native coordinate system, i.e. the direction of the camera in its native coordinate system associated with the mechanics of the video camera. As mentioned above, such functionality is provided in modern controlled video cameras and implemented, for example, by the camera control device 118.

In step 206, based on the known exact location of the video monitoring point 110, the position of the astronomical object is determined in the video camera's absolute coordinate system at the current time. As mentioned above, in astronomy, there are known methods and formulas which enable to determine, from the known geographic coordinates of the observer and the exact time of day, azimuth and altitude of the astronomical object, that is, the coordinates of the object in the horizontal coordinate system.

The procedure according to steps 202-206 should be performed repeatedly, where successive performances are separated by a certain period of time. The minimum number of performances is two, which follows from the detailed discussion presented hereinbelow. At the same time, in order to improve accuracy, said procedure may be performed more times, since, despite possibly high precision of the devices, each measurement assumes a certain error which can be reduced by repeatedly performing said measurements/determinations.

It is mostly convenient to carry out this procedure on such astronomical object as Sun. In this case, the video camera can be aimed at Sun twice—just after sunrise and before sunset, when brightness is sufficient for detection, but not too high for causing various glares on the lens and damaging electronics of the video camera. It should be emphasized once again that in each of these two time moments the video camera is aimed at Sun (step 202), its orientation is determined in the native coordinate system (step 204), and the position of the astronomical object is determined in the absolute coordinate system, knowing the exact time corresponding to said time moment and the precise geographical coordinates of the video camera (step 206).

Based on the video camera orientations and positions of the astronomical object, as determined in steps 204 and 206, step 208 calculates a rotation of the video camera's native coordinate system in the absolute coordinate system associated with it. The calculated rotation of the video camera's native coordinate system allows to determine recalculation coefficients for coordinates of an observed object from the video camera's native coordinate system into the absolute coordinate system.

In fact, the following correspondences are achieved: vertical and horizontal (panoramic) angle in the video camera's native coordinate system—altitude of the astronomical object (for example, Sun) above the mathematical horizon (vertical angle in the absolute coordinate system) that is bound to the location of the camera (observer), and azimuth (horizontal angle in the absolute coordinate system) bound to the location of the video camera.

For further recalculation from the video camera coordinate system into the absolute (horizontal) coordinate system, it is necessary, based on the correspondence data, to determine the rotation of the native coordinate system in the absolute coordinate system, and, to this end, the Euler angles can be determined, for example. The Euler angles are the angles describing rotation of a perfectly rigid body in the three-dimensional Euclidean space.

Upon determination of the Euler angles, it is possible to obtain, for each point in the native coordinate system, the value in the absolute coordinate system, which means that for every visible object we can recalculate the obtained direction to said object in the absolute coordinate system associated with the location of the camera, i.e., in fact, eliminate the influence of the above factors on the accuracy of determination of the observed object direction.

Mathematically, this is expressed as follows.

We obtain two correspondences of two observation points in the horizontal coordinate system (azimuth (a), altitude (v)) to two points in the video camera's native coordinate system (panoramic angle (p), vertical angle (t)):

$$(a1,v1)-(p1,t1),$$

$$(a2,v2)-(p2,t2).$$

According to the example given above, these points can correspond to the two aimings of the video camera at Sun.

Based on this, it is necessary to obtain three Euler angles e1, e2, e3, i.e.

$$e1=f1(a1,v1,p1,t1,a2,v2,p2,t2),$$

$$e2=f2(a1,v1,p1,t1,a2,v2,p2,t2),$$

$$e3=f3(a1,v1,p1,t1,a2,v2,p2,t2).$$

Then, knowing the three Euler angles, we obtain for each (p, t) the correspondence (a, v), i.e.

$$a=f1(p,t,e1,e2,e3),$$

$$v=f2(p,t,e1,e2,e3).$$

Let us dwell on the problem of coordinate recalculation and determination of the Euler angles.

Direct Problem

Figure 3:
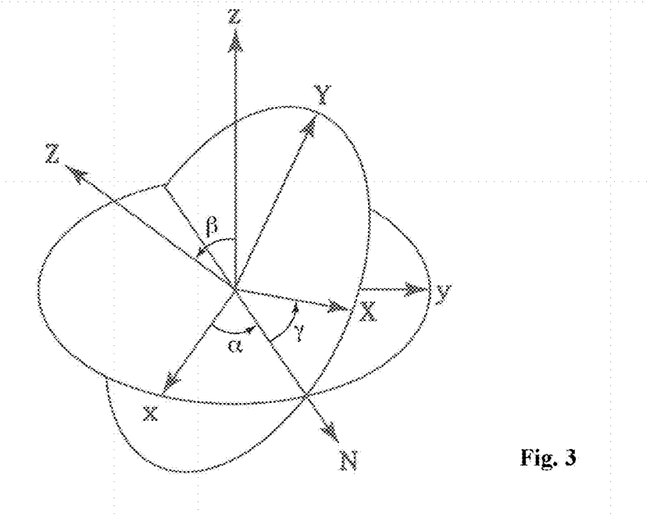
FIG. 3 illustrates the Euler angles.

The correspondence between the visible object coordinates in the video camera's native coordinate system (p, t), where p—panoramic angle, t—vertical angle, and the absolute coordinates (a, v), where a—azimuth, v—angular altitude above the mathematical horizon, is defined by the Euler angles α, β, γ which in this case describe the rotation (orientation) of the video camera's native coordinate system in the absolute coordinate system. FIG. 3 schematically shows the Euler angles. The "binding of the camera" or "binding of the camera's native coordinate system" in this application substantially refers to a certain orientation (rotation) of the video camera's native coordinate system in the absolute coordinate system, as described by the Euler angles.

The Euler angles allow to map any position of the system to the current position. Let us denote the initial coordinate system as (x, y, z), and the final one as (X, Y, Z). The intersection of the coordinate planes xy and XY is called the nodal line N, where:

angle α is the angle between the axis x and the nodal line.
angle β is the angle between the axes z and Z.
angle γ is the angle between the axis X and the nodal line.

The rotations of the coordinate system by these angles are called precession, nutation and intrinsic rotation (spin). These rotations are non-commutative, and the final position of the system depends on the order in which the rotations are performed. In the case of the Euler angles, it is represented by the sequence 3, 1, 3 (Z, X, Z) (See FIG. 3).

Upon determination of the Euler angles, the rotation matrix is calculated, based on which the angles (a, v) are uniquely determined for each pair (p, t). The matrix of rotation of the Cartesian coordinates for the Euler angles is as follows:

$$M(\alpha, \beta, \gamma) = \begin{pmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{pmatrix}$$

To use this matrix, the angles (p, t) must be converted to the Cartesian coordinate system. The angle p corresponds to the angle φ in the spherical coordinate system, and the angle θ=π/2+t. The radius of the sphere is not important, because its size does not change when rotating, so r=1. The coordinates in the Cartesian coordinate system are determined as:

$$\begin{cases} x = r\sin\theta\cos\varphi, \\ y = r\sin\theta\sin\varphi, \\ z = r\cos\theta. \end{cases}$$

In multiplying the rotation matrix to the column vector $$\begin{pmatrix} x \\ y \\ z \end{pmatrix},$$

the column vector is $$\begin{pmatrix} x_1 \\ y_1 \\ z_1 \end{pmatrix}$$

determined. Based on the determined column vector, new spherical coordinates are determined as:

$$\begin{cases} \theta_1 = \arctg\left(\frac{\sqrt{x_1^2 + y_1^2}}{z_1}\right). \\ \varphi_1 = \arctg\left(\frac{y_1}{x_1}\right) \end{cases}$$

Thus, the azimuth of the point corresponds to $\varphi_1$, and the angle of inclination corresponds to $$\theta_1 - \frac{\pi}{2}.$$

That is, a, v are determined from the known p and t and Euler angles α, β, γ.

Inverse Problem

In order to determine the Euler angles based on the known relations of orientations in the inherent and absolute coordinate systems, it is necessary to solve the problem which is inverse to the above direct problem.

For the inverse problem, namely for finding the Euler angles, let us describe the rotation of the system by using quaternions. In this case, "quaternion" is a quadruple of numbers (x, y, z, w), where (x, y, z) is a vector, and w is a scalar. In this representation of the quaternion, the first three components represent a vector which belongs to the rotation axis, where the vector length depends on the rotation angle. The fourth component depends only on the value of the rotation angle. The dependence is quite simple—if we take the unit vector V for the rotation axis and the angle alpha for rotation around this axis, then the quaternion representing this rotation can be written as follows:

$$q=[V^*\sin(alpha/2),\cos(alpha/2)].$$

The initial data of the inverse problem are two pairs of mutually related vectors, namely $(p_1, t_1) \rightarrow (a_1, v_1)$ and $(p_2, t_2) \rightarrow (a_2, v_2)$, where (p, t) are the coordinates in the video camera's native coordinate system, and (a, v) are the coordinates in the video camera's absolute coordinate system. Let us translate each of these vectors into the Cartesian coordinate system, and we obtain the corresponding vectors: $(x_i, y_i, z_i) \rightarrow (u_i, v_i, w_i)$, i=1, 2.

Now we will find the rotation quaternion of the camera initial coordinate system that transforms the vector ($x_1$, $y_1$, $z_1$) into ($u_1$, $v_1$, $w_1$). This quaternion will describe the shortest distance rotation. To find it, we use the following formulas:

($x_1$, $y_1$, $z_1$)⊗($u_1$, $v_1$, $w_1$)=(a, b, c) is the cross product of the input vector by the final vector;

q=[a, b, c, ($x_1$, $y_1$, $z_1$)●($u_1$, $v_1$, $w_1$)] is the sought quaternion (here ($x_1$, $y_1$, $z_1$)●($u_1$, $v_1$, $w_1$) is the scalar product of the vectors).

And in the last step let us normalize the quaternion q: to this end, we divide x, y, z, w included thereby by $n=\sqrt{x^2+y^2+z^2+w^2}$.

The quaternion obtained in this step defines the rotation of the Cartesian coordinate system that translates ($x_1$, $y_1$, $z_1$) into ($u_1$, $v_1$, $w_1$).

Let us rotate the coordinate system, and, to this end, we use the rotation formula: V'=qvq⁻, where v is the original vector, and V' is the vector after the rotation. Thus, after the rotation of the Cartesian coordinate system by the quaternion q we have two vectors: ($u_1$, $v_1$, $w_1$) obtained from ($x_1$, $y_1$, $z_1$), and a certain vector ($u_p$, $v_p$, $w_p$) obtained from ($x_2$, $y_2$, $z_2$). Now, it is necessary to rotate the Cartesian coordinate system in such a way that the vector $(u_1, v_1, w_1)$ remains in place, and the vector $(u_p, v_p, w_p)$ transitions into a vector $(u_2, v_2, w_2)$ (in general, it is possible not for any vectors, but as we take their values from the real system, we believe that such a rotation is possible).

Obviously, in order to perform such a rotation, it is necessary that the rotation axis passes through the point $(u_1, v_1, w_1)$ and the origin of coordinates. To find the rotation angle, we will find the angular distance on the sphere between two points $(u_p, v_p, w_p)$ and $(u_2, v_2, w_2)$. To this end, let us translate them into the spherical coordinate system: $\rightarrow(\phi_1, \lambda_1)$ and $(\phi_2, \lambda_2)$, respectively. Then, we use the formula for finding the angular distance (this formula is widely used, for example, in astronomy):

$$\Delta\sigma = \arctan\left\{\frac{\sqrt{[\cos\phi_2\sin\Delta\lambda]^2 + [\cos\phi_1\sin\phi_2 - \sin\phi_1\cos\phi_2\cos\Delta\lambda]^2}}{\sin\phi_1\sin\phi_2 + \cos\phi_1\cos\phi_2\cos\Delta\lambda}\right\}$$

where $\Delta\lambda$ is the difference between the coordinates in longitude, that is, the difference between the coordinates in the angle $\lambda$, and $\Delta\sigma$ is the angular difference.

Using the obtained angle and knowing the rotation axis, we obtain the rotation quaternion that transforms the vector $(u_p, v_p, w_p)$ into $(u_2, v_2, w_2)$: $q_2=[(u_1, v_1, w_1)*\sin(\Delta\sigma/2), \cos(\Delta\sigma/2)]$ Thus, we have obtained two rotation quaternions, $q$ and $q_2$ which, when applied sequentially, transform the original points $(x_i, y_i, z_i)$ into $(u_i, v_i, w_i)$, i=1, 2. According to the definition and properties of quaternions, the rotation quaternion, which is equivalent to two successive applications $q$ and $q_2$, is equal to $q_2*q$. We denote it as $Q=[X, Y, Z, W]$.

Next, we use the known formula for translating the quaternion into the Euler angles to obtain:

$$\begin{cases} \alpha = \text{arctg}\left(\frac{2XW - 2XZ}{1 - 2Y^2 - 2Z^2}\right) \\ \beta = \arcsin(2XY + 2ZW) \\ \gamma = \text{arctg}\left(\frac{2XW - 2YZ}{1 - 2X^2 - 2Z^2}\right) \end{cases}$$

This calculation can be done with sufficient accuracy, since the astronomical object position can be estimated with the accuracy of up to few tenths/hundredths of a degree, according to the aforesaid.

It should be noted that the above-described automatic binding method does not have to rely solely on an astronomical object(s). From the above description, it should be apparent to those skilled in the art that substantially any discernible object, whose position in the video camera's absolute coordinate system is known or can be determined at a given time(s) with sufficient accuracy, can act as the astronomical object. Any discernible still object visible in the terrain may serve as such object, which is exemplified below.

The above procedure 200 is implemented, at least partially (i.e., at least, its steps 206, 208), in the form of a computer-implemented module. The computer-implemented module is preferably software that can be, in a local or distributed manner, stored in memory units and run by processors at the server 140, and/or the computer of the operator workstation 120, and/or the transmission-side equipment 111, depending on the design of the system 100. At the same time, the computer-implemented module may also represent a hardware or firmware unit (e.g., a blade server in a blade server chassis or a single computing device), which should be obvious for those skilled in the art. The above software can be developed using an appropriate programming technology chosen from a plurality of available technologies.

2. Correction to the Video Camera Binding

In order to provide the capability of filtering out false objects upon response from automatic detection algorithms, it is necessary to accurately determine the direction to a previously detected object as it is detected again. This task is complicated by the fact that the camera binding changes for various reasons, that is, the orientation of the native coordinate system of the video camera (rotating device) changes in the absolute (horizontal) coordinate system associated with the video camera location.

In order to eliminate the influence of this effect on the accuracy of determining the direction to an object when it is detected again, it is necessary to determine how the orientation of the video camera's native coordinate system in the absolute coordinate system has changed for the period elapsed between the repeated detections of the object.

To this end, it is proposed to use the objects visible in the terrain which are certainly known as not changing their position or changing it slightly (i.e. they are substantially still). These objects can be any visible stationary objects (e.g., window shutters, road signs, etc.).

Figure 4:
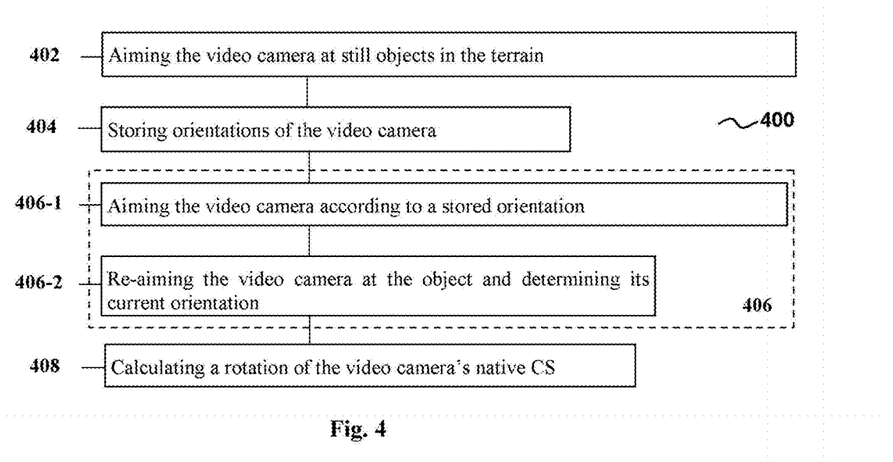
FIG. 4 is an illustrative flowchart of the method for determining a change in binding of the video camera's native coordinate system according to the present invention.

Below with reference to FIG. 4, there is described the method 400 implemented by the forest fire video monitoring system (such as the system 100 of FIG. 1) according to the present invention for determining a change in binding of the video camera.

In step 402, the video camera is aimed at each of at least two predefined discernible still objects in the terrain, and an orientation of the video camera in the video camera's native coordinate system is determined.

In step 404, the video camera orientations determined in step 402 are stored. The determined orientations can be stored in the storage device comprised by the server 140 and/or the computer of the operator workstation 120.

If verification is necessary, the following sub-steps are performed in step 406 for each of said still objects. In sub-step 406-1, the video camera is aimed according to the video camera orientation stored in step 404 that corresponds to said object. In sub-step 406-2, if during the period between the aimings at the object the video camera has displaced (for example, due to the possible reasons indicated above), then the video camera is re-aimed at the object and its current orientation in the video camera's native coordinate system is determined.

In step 408, based on the video camera current orientations determined in sub-step 406-2 and the respective video camera orientations stored in step 404, the rotation of the video camera's native coordinate system is calculated that defines the correction for the aforementioned video camera displacement. In fact, the rotation of the video camera's native coordinate system at the time of performing step 406 relative to the video camera's native coordinate system at the time of performing step 402 is substantially determined.

Subsequently, for example, when the video camera detects a potentially dangerous object, the current camera orientation is compared to the orientation determined based on the previously stored camera orientation to the object previously marked as non-dangerous and based on the calculated rotation of the video camera's native coordinate system.

The possible implementation of steps 402-408 by means of the components of the system 100 is indicated above or obviously follows from the description of said system.

It should be obvious to those skilled in the art that in implementation of the above procedure 400 more than two stationary objects can be used. The number of such objects is generally defined by the required accuracy—in particular, if the number of the objects increases, we increase the number of independently obtained measurement results, which leads, with appropriate processing, to the increased direction determination accuracy.

As described above, in order to determine the rotation, it is necessary to determine the Euler angles which in this case will describe the rotation of the video camera's native coordinate system for the current time moment relative to the video camera's native coordinate system fixed during the preceding procedure of saving the orientation.

The mathematical problem is identical to that described above, both in essence and in the sense of complexity.

Let us suppose that the camera has slightly displaced, i.e. a visible object that has had the one coordinates in the video camera's native coordinate systems, namely (p11, t11) (which have been preliminarily saved), now has the other coordinates, namely (p12, t12). We thus obtain the correspondences:

$$(p11,t11)-(p12,t12),$$

$$(p21,t21)-(p22,t22)$$

Based on these correspondences, the Euler angles are determined similar to the above, i.e.

$$e1=f1(p11,t11,p12,t12,p21,t21,p22,t22),$$

$$e2=f2(p11,t11,p12,t12,p21,t21,p22,t22),$$

$$e3=f3(p11,t11,p12,t12,p21,t21,p22,t22).$$

After finding the Euler angles (e1, e2, e3) for each of the previously marked objects (e.g. as non-dangerous), given the stored video camera orientation to this object (p1, t1), the adjusted orientation of the video camera to said object (pn, tn), i.e. the orientation adjusted for the video camera displacement, can be determined as follows:

$$pn=f1(e1,e2,e3,p1,t1),$$

$$tn=f2(e1,e2,e3,p1,t1)$$

according to the method described above, when compared to the current orientation of the camera.

For the most accurate operation of the system, the binding procedure 400 can be performed before each patrolling; this procedure is expected not to take much time (few seconds).

Figure 5:
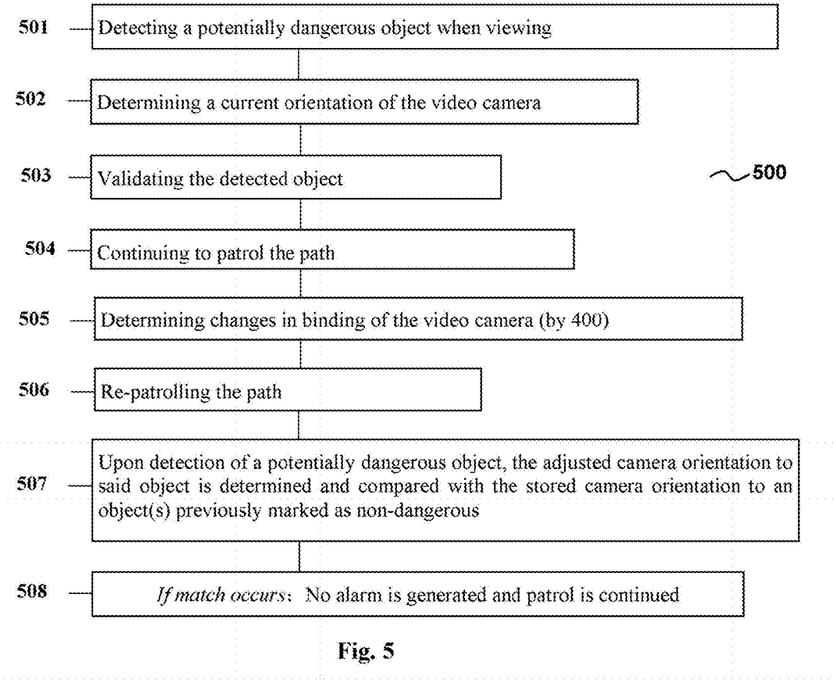
FIG. 5 is an illustrative flowchart of the method for filtering observed objects in patrolling.

Referring to FIG. 5, the method 500 for filtering observed objects, which involves the above method 400, may operate as follows.

During the patrolling, the video camera inspects the territory; the automatic algorithm for detection of dangerous objects identifies a potentially dangerous object (step 501) in the video image. Upon this, the current orientation of the camera is identified (step 502). Further, the detected object is validated in some manner—for example, the operator himself performs the validation, which may consist in visual representation of the potentially dangerous object to the operator who should confirm or refute danger of the detected object (step 503). After that, the system continues to patrol along the specified path (step 504).

After some time defined by the class of fire danger and requirements for the detection rate (for example, every 15 minutes), the system once again starts travelling the path (step 506). Before this, the procedure of determining changes in binding of the video camera is performed according to the above method 400 (step 505).

When a potentially dangerous object is detected, the orientation of the video camera to said object is determined and compared with the stored video camera orientation to an object(s) which was designated as non-dangerous in the past patrolling(s) that is adjusted based on the computed rotation of the video camera's native coordinate system (step 507). If the orientations coincide with the pre-specified accuracy defined by the system settings (e.g., up to 0.01'), then the system does not generate a new alarm for the operator and does not require validation, and continues to patrol (step 508). This method can significantly reduce the operator workload, increase the number of cameras per operator, and reduce the number of false alarms.

The above procedure 400 is implemented, at least partially (i.e. at least, its step 408), in the form of a computer-implemented module. The computer-implemented module is preferably software that can be, in a local or distributed manner, stored in memory units and run by processors at the server 140, and/or the computer of the operator workstation 120, and/or the transmission-side equipment 111, depending on the design of the system 100. At the same time, the computer-implemented module may also be a hardware or firmware unit (e.g., a blade server in a blade server chassis or a single computing device), which should be obvious for those skilled in the art. The above software can be developed using an appropriate programming technology chosen from a plurality of available technologies.

The invention has been described above with reference to specific embodiments thereof. For those skilled in the art other embodiments of the invention should be obvious that fall within the spirit and scope of the present invention, as it is disclosed herein. Accordingly, the invention should be regarded as limited in scope only by the following claims.

The invention claimed is:

1. A forest fire video monitoring system comprising:
   at least one remotely controlled video monitoring point which includes a high-rise construction and a transmission-side equipment residing on the high-rise construction, the transmission-side equipment comprising: a video camera on a rotating device; and a camera control unit configured to determine a current spatial orientation of the video camera in a native coordinate system of the video camera;
   at least one computerized operator workstation for operating said video monitoring point; and
   a computer-implemented module configured:
   in each of at least two predetermined time moments, to obtain an orientation of the video camera aimed at a known astronomical object, said orientation determined by the camera control unit in the native coordinate system of the video camera, and to determine, based on a predetermined location of the video monitoring point and said at least two predetermined time moments, a position of the astronomical object in an absolute coordinate system centered in a point in which the video camera resides, and
   to calculate, based on the determined orientations of the video camera and positions of the astronomical object, a rotation of the native coordinate system of the video camera in the absolute coordinate system.

2. The system of claim 1, wherein the transmission-side equipment of said video monitoring point further comprises a communication device, wherein the system further comprises a server, and wherein the video monitoring point, the server, and the operator workstation are communicatively connected to each other.

3. The system of claim 2, wherein the video camera of the transmission-side equipment of said video monitoring point is equipped with a zoom.

4. The system of claim 3, wherein the video camera is aimed at the astronomical object by manually matching the center of an image obtained from the video camera with the center of the astronomical object.

5. The system of claim 3, further comprising a computer-implemented intelligent subsystem configured, based on computer vision technologies, to aim the video camera at the astronomical object by automatically detecting the astronomical object based on analysis of an image obtained from a video camera, and automatically matching the center of the image obtained from the video camera with the center of the astronomical object.

6. The system of claim 4, wherein, when aiming the video camera at the astronomical object, the zoom is used to zoom in the astronomical object to the maximum possible extent.

7. The system of claim 5, wherein, when aiming the video camera at the astronomical object, the zoom is used to zoom in the astronomical object to the maximum possible extent.

8. The system of claim 2, wherein said computer-implemented module resides at the server, and/or said operator workstation, and/or the transmission-side equipment of said video monitoring point.

9. The system of claim 1, wherein the astronomical object is Sun.

10. The system of claim 1, wherein the native coordinate system of the video camera is defined by a manufacturer of the video camera.

11. The system of claim 1, wherein the location of said video monitoring point is defined by its geographical coordinates, and the position of the astronomical object is defined by its azimuth and angular altitude above the horizon.

12. The system of claim 1, wherein the calculated rotation of the native coordinate system of the video camera is used to recalculate coordinates of an observed object from the native coordinate system of the video camera into the absolute coordinate system.

13. In a forest fire video monitoring system comprising at least one remotely controlled video monitoring point comprising: a video camera on a rotating device residing on a high-rise construction; and a camera control unit configured to determine a current spatial orientation of the video camera in a native coordinate system of the video camera, a method for automatically binding the native coordinate system of the video camera to an absolute coordinate system, the method comprising the steps of:
in each of at least two predetermined time moments
aiming the video camera at a known astronomical object, and determining an orientation of the video camera in the native coordinate system of the video camera, and determining, based on a predetermined location of the video monitoring point and said at least two predetermined time moments, a position of the astronomical object in the absolute coordinate system centered in a point in which the video camera resides; and
calculating, based on the determined orientations of the video camera and positions of the astronomical object, a rotation of the native coordinate system of the video camera in the absolute coordinate system.

14. The method of claim 13, further comprising, based on the calculated rotation of the native coordinate system of the video camera, recalculating coordinates of an observed object from the native coordinate system of the video camera into the absolute coordinate system.

15. The method of claim 13, wherein the video camera is aimed at the astronomical object by manually matching the center of an image obtained from the video camera with the center of the astronomical object.

16. The method of claim 13, wherein the video camera is aimed at the astronomical object by automatically detecting the astronomical object based on analysis of an image obtained from the video camera and automatically matching the center of the image obtained from the video camera with the center of the astronomical object, based on computer vision technologies.

17. A forest fire video monitoring system comprising:
at least one remotely controlled video monitoring point which includes a high-rise construction and a transmission-side equipment residing on the high-rise construction, the transmission-side equipment comprising: a video camera on a rotating device; and a camera control unit configured to determine a current spatial orientation of the video camera in a native coordinate system of the video camera;
at least one computerized operator workstation for operating said video monitoring point; and
a computer-implemented module configured:
in each of at least two predetermined time moments, to obtain an orientation of the video camera in the native coordinate system of the video camera, wherein the orientation is determined by the camera control unit when the video camera is aimed at a known astronomical object, wherein a position of the astronomical object in an absolute coordinate system centered in a point in which the video camera resides is known at said at least two predetermined time moments,
to calculate, based on the determined orientations of the video camera and positions of the astronomical object, a rotation of the native coordinate system of the video camera in the absolute coordinate system.

18. In a forest fire video monitoring system comprising at least one remotely controlled video monitoring point comprising: a video camera with a rotating device residing on a high-rise construction; and a camera control unit configured to determine a current spatial orientation of the video camera in a native coordinate system of the video camera, a method for automatically binding the native coordinate system of the video camera to an absolute coordinate system, the method comprising the steps of:
in each of at least two predetermined time moments, aiming the video camera at an object a position of which in the absolute coordinate system centered at a point in which the video camera resides is known at said at least two predetermined time moments, and determining an orientation of the video camera in the native coordinate system of the video camera; and
based on the determined orientations of the video camera and positions of the object, calculating a rotation of the native coordinate system of the video camera in the absolute coordinate system.

* * * * *